(12) United States Patent
Scheffel et al.

(10) Patent No.: US 9,702,475 B2
(45) Date of Patent: Jul. 11, 2017

(54) ELECTROMAGNETICALLY ACTUATABLE VALVE

(71) Applicant: Robert Bosch GmbH, Suttgart (DE)

(72) Inventors: Martin Scheffel, Vaihingen (DE); Philipp Rogler, Stuttgart (DE); Joerg Abel, Gerlingen (DE); Jens Pohlmann, Bietigheim-Bissingen (DE); Anna Salvat Massoni, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 14/286,495

(22) Filed: May 23, 2014

(65) Prior Publication Data

US 2014/0346382 A1 Nov. 27, 2014

(30) Foreign Application Priority Data

May 24, 2013 (DE) ........................ 10 2013 209 672

(51) Int. Cl.
*F16K 31/06* (2006.01)
*F02M 51/06* (2006.01)

(52) U.S. Cl.
CPC ......... *F16K 31/06* (2013.01); *F02M 51/0614* (2013.01); *F02M 51/0664* (2013.01); *F02M 51/0671* (2013.01); *F02M 2200/02* (2013.01); *F02M 2200/09* (2013.01); *F02M 2200/304* (2013.01)

(58) Field of Classification Search
CPC F16K 31/06; F02M 51/0614; F02M 51/0664; F02M 2200/02; F02M 2200/09; F02M 2200/304

USPC ....................................... 251/129.15
See application file for complete search history.

(56) References Cited

U.S. PATENT DOCUMENTS

| 3,168,242 | A | * | 2/1965 | Diener | ................. | G05D 23/241 236/75 |
| 6,853,276 | B2 | * | 2/2005 | Smith | .................. | H01H 50/163 335/132 |
| 6,994,406 | B1 | * | 2/2006 | Krawczyk | ............... | B60T 8/363 251/129.02 |
| 7,051,960 | B2 | * | 5/2006 | Oguma | .............. | F02M 51/0671 239/585.1 |
| 7,086,614 | B2 | * | 8/2006 | Stier | .................. | F02M 51/0671 239/585.2 |

(Continued)

FOREIGN PATENT DOCUMENTS

| DE | 19833461 | 1/2000 |
| JP | 2010261396 | 11/2010 |
| JP | 2010261396 A * | 11/2010 |

*Primary Examiner* — John K Fristoe, Jr.
*Assistant Examiner* — Seth W Mackay-Smith
(74) *Attorney, Agent, or Firm* — Norton Rose Fulbright US LLP; Gerard Messina

(57) ABSTRACT

An electromagnetically actuatable valve is described, for controlling fluids, having an inner pole and a magnetic armature, the inner pole having a first end face oriented to the magnetic armature, and the magnetic armature having a second end face oriented to the inner pole, a first contact line and a second contact line being present between the first and second end face when the inner pole and the magnetic armature come into contact with one another, and a damping volume being present between the first and second contact line when the inner pole and the magnetic armature come into contact with one another.

16 Claims, 3 Drawing Sheets

(56) References Cited

U.S. PATENT DOCUMENTS

| | | | | |
|---|---|---|---|---|
| 7,108,242 B2* | 9/2006 | Goossens | ................ | B60T 8/363 |
| | | | | 251/129.15 |
| 7,219,876 B2* | 5/2007 | Kaneko | .............. | F02M 63/0015 |
| | | | | 251/129.16 |
| 7,441,746 B2* | 10/2008 | Sugiyama | .......... | F02M 51/0614 |
| | | | | 251/129.15 |
| 8,870,160 B2* | 10/2014 | Ambrosi | ............. | F16K 31/0665 |
| | | | | 251/129.15 |
| 2011/0204272 A1* | 8/2011 | Kratzer | ............... | F16K 31/0662 |
| | | | | 251/129.15 |

* cited by examiner

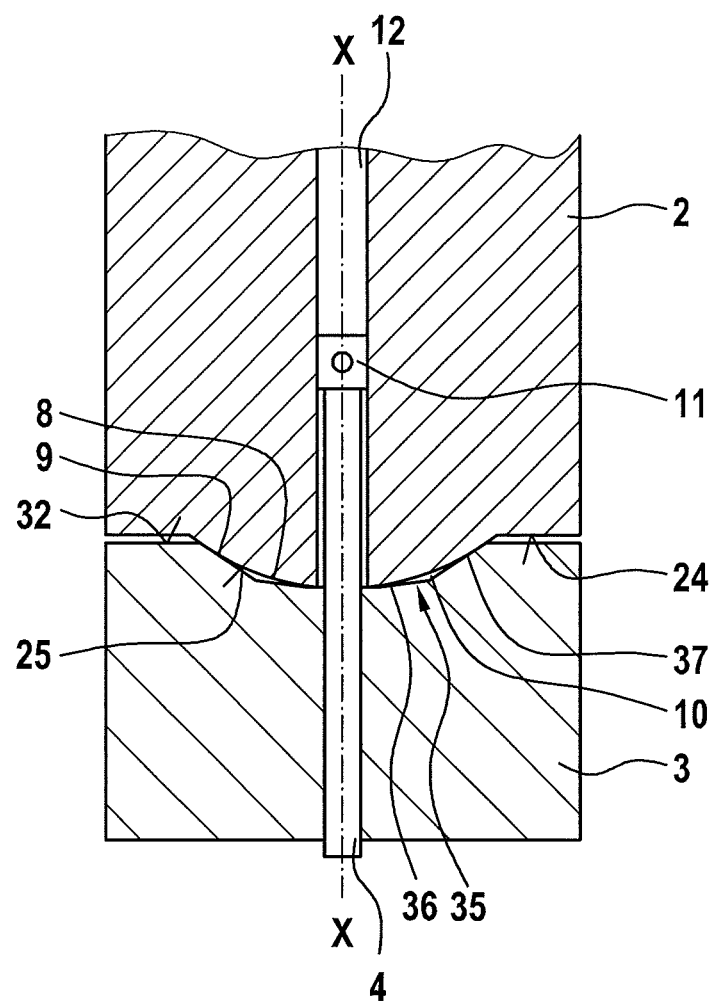

ELECTROMAGNETICALLY ACTUATABLE VALVE

FIELD OF THE INVENTION

The present invention relates to an electromagnetically actuatable valve for controlling fluids, in particular fuel.

BACKGROUND INFORMATION

Valves are known from the existing art in various embodiments. In fuel injection valves, electromagnetically actuatable valves are often used in which a magnetic armature is attracted by an inner pole. When this happens, the magnetic armature can impact against the inner pole or against a stop. As a result, during operation wear can occur, so that the components subject to wear are often provided with a wear-resistant layer, for example made of chrome or nickel. In addition, from German Published Patent Application No. 198 33 461 a magnetic valve is known in which the components that impact one another, the magnetic armature and the inner pole, are made in such a way that one of the components that strike one another has a spherically curved surface. This design has proved effective, but it would be desirable if a further reduction of noise and of wear were possible, in order to ensure the longest possible lifespan of magnetic valves.

SUMMARY

The electromagnetically actuatable valve according to the present invention for controlling fluids has, in contrast, the advantage that an additional damping and reduction of an impact impulse is possible. In addition, according to the present invention an improved wear characteristic of the valve can be achieved. According to the present invention, this is achieved in that an inner pole and a magnetic armature each have an end face directed toward one another, the end faces being shaped in such a way that a first and second contact line are present between the two end faces when the inner pole and the magnetic armature come into contact. In addition, here a damping volume is present between the first and second contact line. According to the present invention, a damping fluid volume is therefore present between two contact lines, which significantly reduces an impact impulse and wear at the inner pole and at the magnetic armature. In particular, in the valve according to the present invention an expensive wear-resistant layer is no longer necessary; rather, the end faces of the inner pole and of the magnetic armature can be produced without an additional wear-resistant layer. This makes production of the valve significantly less expensive.

Preferably, the two contact lines are each circular lines. Here, it is further preferable that the two contact lines are preferably situated concentric to a center axis of the valve. In this way, a symmetrical realization of the valve is ensured.

In addition, preferably one of the end faces of the inner pole or of the magnetic armature is a multiple cone and the other end face is a spherical surface. In this way, the two contact lines between the inner pole and the magnetic armature can be obtained through a contact of the spherical surface with at least two cone surfaces of the multiple cone. Particularly preferably, the multiple cone can be provided with exactly one first and one second cone surface, and is thus particularly easy to produce. Here, the spherical surface respectively contacts one of the first and second cone surfaces.

In addition, preferably the end face of the inner pole is fashioned as a multiple cone having at least one first and second cone region, and the end face of the magnetic armature is fashioned as a spherical surface.

Alternatively, the end face of the inner cone is fashioned as a spherical surface, and the end face of the magnetic armature is fashioned as a multiple cone having at least a first and second cone region.

In addition, preferably the end faces on the inner pole and on the magnetic armature each have a flat region that is perpendicular to a longitudinal axis of the valve. The flat regions on the end faces are preferably situated radially outside the two contact lines between the inner pole and the magnetic armature. On the flat regions provided perpendicular to the longitudinal axis of the valve, the magnetic flux is conducted parallel to the direction of movement of the magnetic armature and thus perpendicular to the flat regions. In this way, a necessary magnetic force level can be obtained because in particular field lines that run over a spherical surface between the inner pole and the magnetic armature contribute only to a small degree to the production of force, because the field lines are not oriented to the direction of movement of the magnetic armature, but rather exit into the working air gap perpendicular to the surface of the sphere.

Particularly preferably, the end faces of the inner pole and magnetic armature are fashioned such that the inner pole and the magnetic armature come into contact with one another only at the two contact lines.

In addition, preferably the end face of the magnetic armature is fashioned as a spherical surface, and the magnetic armature has in addition a guide region, the guide region being situated in a plane perpendicular to the longitudinal axis of the valve, and a midpoint of the spherical surface of the end face of the magnetic armature being situated in the plane. In this embodiment, an armature-inner pole configuration can be ensured that is particularly robust against tilting.

A particularly compact design results if the magnetic armature is connected to a valve needle and the valve needle is guided in the inner pole.

Preferably, none of the end faces of the inner pole and magnetic armature has a wear-resistant layer, and also none of the end faces of the inner pole and magnetic armature has a magnetic separating layer. Because in the case of contact between the inner pole and the magnetic armature only two contact lines are present, given the presence of a spherical end face a magnetic separating layer can be omitted because a contribution of the field lines to the magnetic adhesive force in the region of the spherical end face is small, because the field lines run perpendicular to the spherical surface and therefore have only a small axial force component.

In addition, preferably the flat regions on the end faces of the inner pole and magnetic armature are fashioned such that even in the case of a maximum tilting of the magnetic armature there is no contact between the inner pole and the magnetic armature in the area of the flat regions.

Particular preferably, the valve according to the present invention is a fuel injection valve.

BRIEF DESCRIPTION OF THE DRAWINGS

FIG. 4 shows a schematic sectional view of an inner pole and a magnetic armature according to a second exemplary embodiment of the present invention.

DETAILED DESCRIPTION

In the following, a fuel injection valve 1 according to a first exemplary embodiment of the present invention is described in detail with reference to FIGS. 1 through 3.

Figure 1:
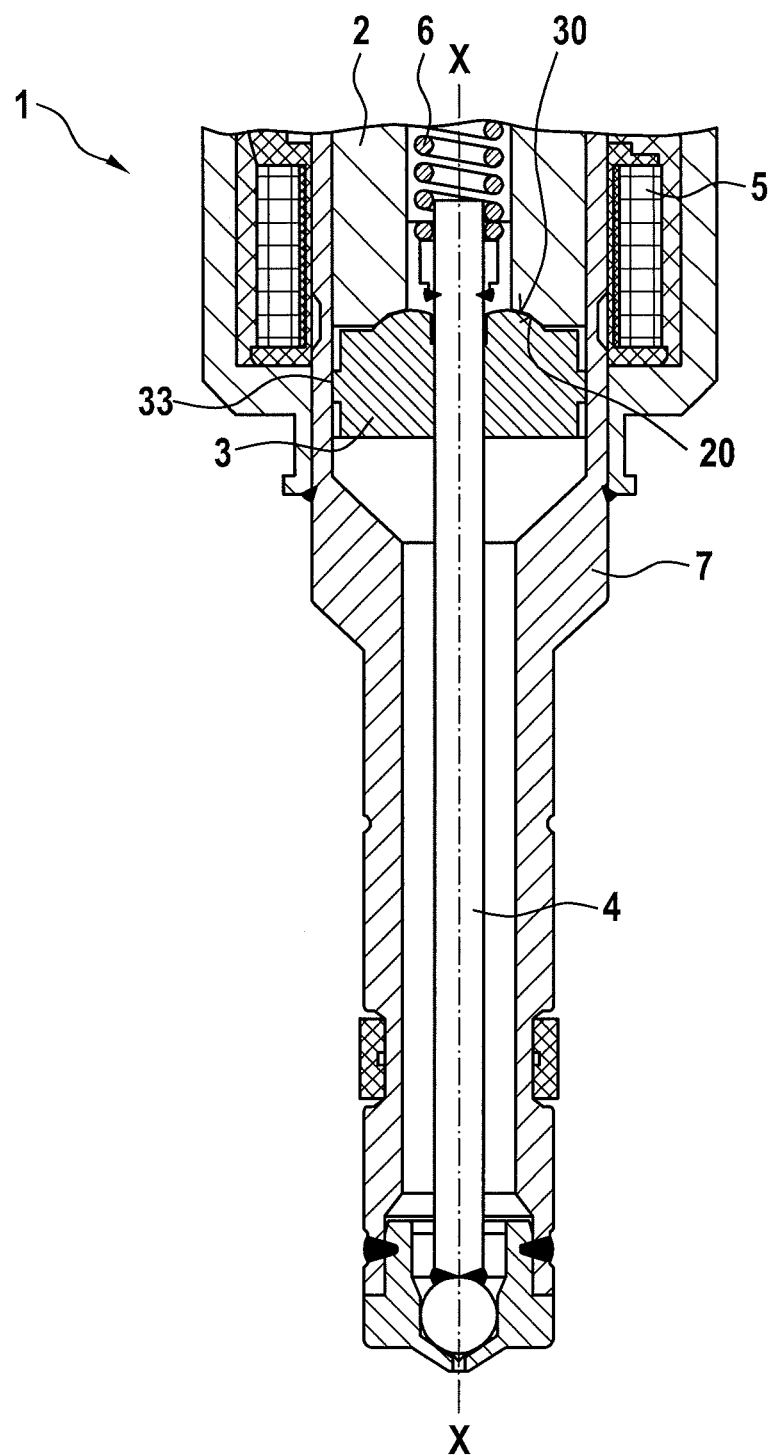
FIG. 1 shows a schematic sectional view of an electromagnetically actuatable valve according to a first exemplary embodiment of the present invention.

As can be seen from FIG. 1, fuel injection valve 1 includes an inner pole 2, a magnetic armature 3, and a coil 5. In addition, a valve needle 4 is provided that is connected to magnetic armature 3. A resetting spring 6 resets valve needle 4 to the initial position shown in FIG. 1, in which fuel injection valve 1 is closed. Reference character 7 designates a housing of the fuel injection valve.

In order to actuate the fuel injection valve, in a known manner coil 5 is supplied with current, causing magnetic armature 3 to be drawn toward inner pole 2, and, given a maximum opening demand of the injection valve, to impact against inner pole 2. FIG. 1 shows the closed state of the valve.

Figure 2:
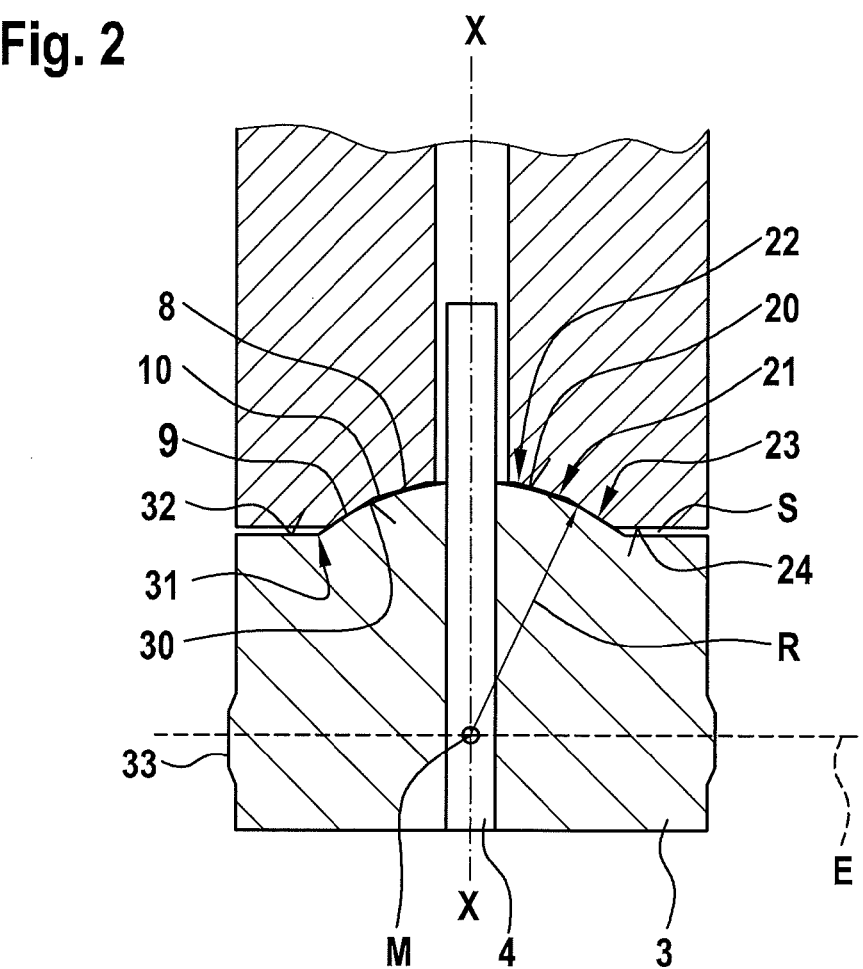
FIG. 2 shows an enlarged schematic representation of a region of impact between an inner pole and a magnetic armature of the valve of FIG. 1.
Figure 3:
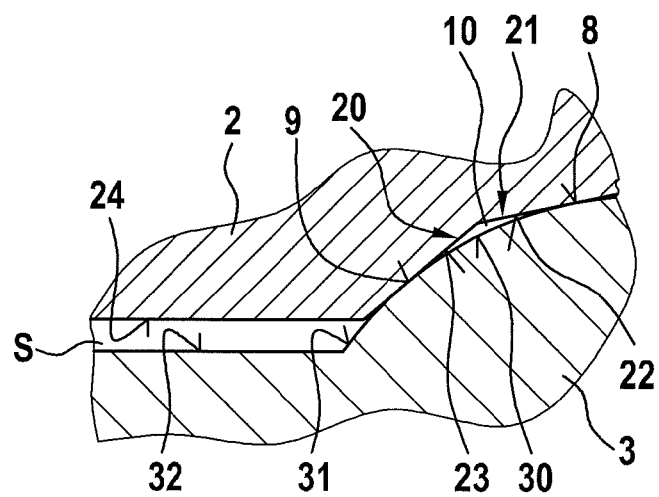
FIG. 3 shows an enlarged schematic representation of an impact of the magnetic armature on the inner pole.

The construction of inner pole 2 and of magnetic armature 3 is shown in detail in FIGS. 2 and 3. As can be seen in FIG. 2, a first end face 20 has a multiple cone 21 and a flat region 24. Multiple cone 21 includes a first cone region 22 and a second cone region 23. Here, flat region 24 on the end face of inner pole 2 is situated further out radially, going out from a center axis X-X of the valve, than is multiple cone 21.

A second end face 30 of magnetic armature 3 has a spherical region 31 and a flat region 32. Flat region 32 is also provided radially further out from center axis X-X than is spherical region 31.

In the open state of the valve shown in FIG. 2, in which magnetic armature 3 impacts inner pole 2, the geometrical realization of end faces 20, 30 of inner pole 2 and magnetic armature 3 results in a first circular contact line 8 and a second circular contact line 9. At first contact line 8, first cone region 22 comes into contact with spherical region 31, and at second contact line 9 second cone region 23 comes into contact with spherical region 31. Here, in the contacted state a gap S still continues to be present between the two flat regions 24, 32.

In this way, a contact between inner pole 2 and magnetic armature 3 is limited to the two contact lines 8, 9. As can be further seen from FIGS. 2 and 3, in this way a damping volume 10 results between the two contact lines 8, 9. In the case of contact, damping volume 10 encloses fuel, and can in this way provide a robust damping at a high level, thereby reducing an impact impulse. As is clear from FIG. 3, here damping volume 10 does not have to have a large volume, so that no additional space requirement results from the realization according to the present invention of end faces 20, 30 of inner pole 2 and of magnetic armature 3.

As can also be seen from FIGS. 2 and 3, the two flat regions 24, 32 of inner pole 2 and of magnetic armature 3 are oriented parallel to one another and thus perpendicular to center axis X-X. In case of impact (FIGS. 2 and 3), gap S is provided in such a way that even in the case of a slight tilting of magnetic armature 2 out of center axis X-X, no contact occurs in the region of flat regions 24, 32. Even when there is a slight tilting of magnetic armature 2, only two contact lines occur, due to the realization according to the present invention of end faces 20, 30. In the case in which magnetic armature 3 is tilted, it is true that these contact lines are then no longer situated concentric to center axis X-X, but nonetheless the same advantages are obtained as in the case of the concentric situation of contact lines 8, 9.

In order to avoid to the greatest possible extent a tilting, magnetic armature 3 also has a guide region 33 on its radial outer side. Guide region 33 is situated in a plane E that is perpendicular to center axis X-X. In this plane E there is also situated a midpoint M of spherical region 31 of magnetic armature 3. Radius R is drawn in in FIG. 2.

Thus, through the idea according to the present invention of the realization of the two impact-side end faces 20, 30 of inner pole 2 and of magnetic armature 3 in the form of a partial sphere on the one hand and in the form of a multiple cone on the other hand, a stop at two contact lines 8, 9 is provided. Here, a damping volume 10 between the two contact lines 8, 9 is defined in the case of impact. Thus, in the case of impact an outstanding damping, and thus reduced wear, can be obtained between inner pole 2 and magnetic armature 3. In this way, a lifespan of the valve can be significantly prolonged without requiring a wear-resistant coating on the inner pole or on the magnetic armature.

In addition, a magnetic adhesion between magnetic armature 3 and inner pole 2 can be additionally reduced, because only a minimal contact, along two lines, is present between the two components in the case of impact.

FIG. 4 shows a second specific embodiment of the present invention; here identical or functionally identical parts have been provided with the same reference characters as in the first exemplary embodiment. In the second exemplary embodiment, inner pole 2 has a spherical region 25 and magnetic armature 3 has a multiple cone 35 having a first cone region 36 and a second cone region 37. Here, again a damping volume 10 is obtained between the two end faces of inner pole 2 and of magnetic armature 3. Likewise, two circular contact lines 8, 9 are obtained in the case of impact shown in FIG. 4. In addition, the valve of the second exemplary embodiment also has a guide element 11 that is situated on the end of valve needle 4. For this purpose, in inner pole 2 a guide opening 12 is provided in which guide element 11 is guided. In this way, valve needle 4, which is connected fixedly to guide element 11 and to magnetic armature 3, is guided in the interior of inner pole 2. In this way, a particularly compact construction can be obtained. In other respects, this exemplary embodiment corresponds to the first exemplary embodiment, so that reference is made to the description given there.

What is claimed is:

1. An electromagnetically actuatable valve for controlling fluids, comprising:
   an inner pole;
   a magnetic armature, wherein:
      the inner pole includes a first end face oriented to the magnetic armature, and
      the magnetic armature includes a second end face oriented to the inner pole;
   a first contact line; and
   a second contact line,
   wherein:
      the first contact line and the second contact line are present between the first and second end faces when the inner pole and the magnetic armature come into contact with one another,
      a damping volume is present between the first and second contact lines when the inner pole and the magnetic armature come into contact with one another, the first end face of the inner pole includes a spherical region, and the second end face of the magnetic armature includes at least one multiple cone having a first cone region and a second cone region.

2. The valve as recited in claim 1, wherein each of the first and second contact lines is a circular line.

3. The valve as recited in claim 2, wherein the circular line is concentric to a center axis of the valve.

4. The valve as recited in claim 1, wherein each one of the first and second end faces includes a flat region, each flat region being perpendicular to a longitudinal axis of the valve.

5. The valve as recited in claim 1, wherein the inner pole and the magnetic armature contact one another exclusively at the first and second contact lines.

6. The valve as recited in claim 1, wherein:

the second end face of the magnetic armature includes a spherical region, the magnetic armature includes a guide region situated in a plane that is situated perpendicular to a longitudinal axis of the valve, and a midpoint of the spherical region is situated in the plane.

7. The valve as recited in claim 1, further comprising:

a valve needle to which the magnetic armature is connected, wherein the valve needle is guided in the inner pole.

8. The valve as recited in claim 1, wherein the first and second end faces of the inner pole and of the magnetic armature do not have a wear-resistant layer.

9. An electromagnetically actuatable valve for controlling fluids, comprising:

an inner pole;

a magnetic armature, wherein:

the inner pole includes a first end face oriented to the magnetic armature, and the magnetic armature includes a second end face oriented to the inner pole;

a first contact line; and a second contact line, wherein:

the first contact line and the second contact line are present between the first and second end faces when the inner pole and the magnetic armature come into contact with one another, a damping volume is present between the first and second contact lines when the inner pole and the magnetic armature come into contact with one another, the first end face of the inner pole includes a multiple cone having at least a first cone region and a second cone region, the second end face of the magnetic armature includes a spherical region, and the spherical region of the second end face of the magnetic armature fits into the multiple cone, so that a first surface of the first cone at least partially contacts the spherical region, and wherein a second surface of the second cone at least partially contacts the spherical region.

10. The valve as recited in claim 9, wherein each of the first and second contact lines is a circular line.

11. The valve as recited in claim 10, wherein the circular line is concentric to a center axis of the valve.

12. The valve as recited in claim 9, wherein each one of the first and second end faces includes a flat region, each flat region being perpendicular to a longitudinal axis of the valve.

13. The valve as recited in claim 9, wherein the inner pole and the magnetic armature contact one another exclusively at the first and second contact lines.

14. The valve as recited in claim 9, wherein:

the second end face of the magnetic armature includes a spherical region, the magnetic armature includes a guide region situated in a plane that is situated perpendicular to a longitudinal axis of the valve, and a midpoint of the spherical region is situated in the plane.

15. The valve as recited in claim 9, further comprising:

a valve needle to which the magnetic armature is connected, wherein the valve needle is guided in the inner pole.

16. The valve as recited in claim 9, wherein the first and second end faces of the inner pole and of the magnetic armature do not have a wear-resistant layer.

* * * * *